Nov. 11, 1952 H. I. BECKER 2,617,494
LUBRICATED HERMETICALLY SEALED ROTATING EQUIPMENT
Filed Feb. 10, 1950
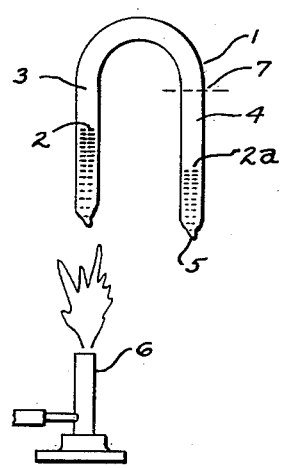
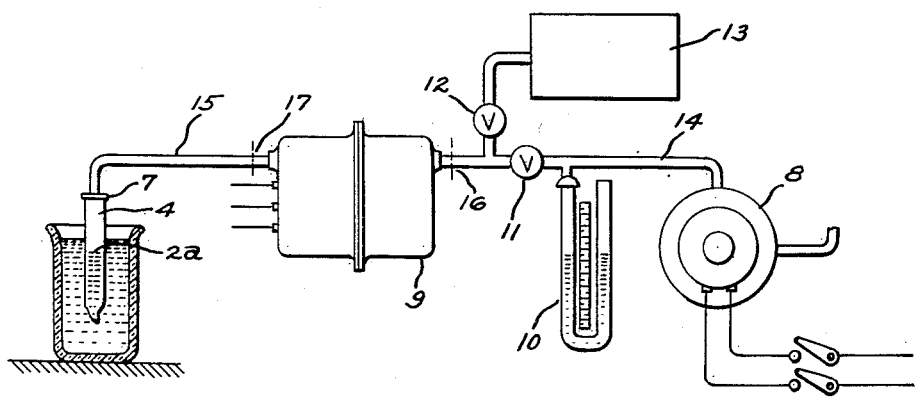
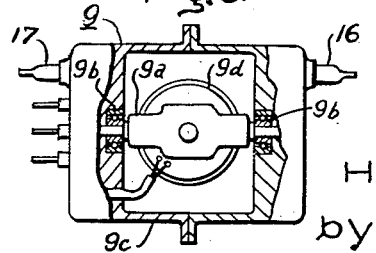
Inventor:
Howard I. Becker,
by Claude A. Mott
His Attorney.

Patented Nov. 11, 1952

2,617,494

UNITED STATES PATENT OFFICE 2,617,494

LUBRICATED HERMETICALLY SEALED ROTATING EQUIPMENT

Howard I. Becker, Vischers Ferry, N. Y., assignor to General Electric Company, a corporation of New York Application February 10, 1950, Serial No. 143,548

1 Claim. (Cl. 184—1)

This invention relates to hermetically sealed, motor driven gyroscopes and, in particular, to the lubricating of hermetically sealed rotating mechanisms.

In recent years, it was found that in tropical climates a fungus growth would frequently accumulate within a machine and interfere with its operation. The fungus growth apparently came from the atmosphere, and its formation was substantially prevented by hermetically sealing machinery.

It is further well known that atmospheric pressure changes and moisture content of the atmosphere frequently impair the functioning of sensitive instruments. The cure for this, also, seems to lie in hermetically sealed instruments.

With hermetical sealing, however, two problems are present; specifically, the cooling and the lubrication of rotating portions of the instrument.

Hermetically sealed gyroscopes, for example, have been satisfactorily cooled by evacuating the gyroscope casing and then charging it with an inert gas, such as nitrogen or helium. The windage set up by rotating elements within the casing circulates the gas over the warm elements and over the cooler casing walls, thus transferring heat to the casing and satisfactorily cooling the instrument.

The lubrication problem, however, has not been so simply solved since a lubricant is required that will keep bearing surfaces wet at all times, preferably without the use of wicks or circulating pumps and without the accumulation of a quantity of oil in places that would cause a delicate instrument to become unbalanced and precess.

One approach to the lubrication problem of hermetically sealed gyroscopes is to saturate the inert cooling gases with oil. As the cooling gases circulate within the instrument, oil is carried to the points that require lubrication. The difficulty in this type lubrication is the unavailability of an oil that either will not vaporize upon contact with hot bearings or that will follow a condensing cycle. By condensing cycle is meant vaporization upon contact with hot bearings and subsequent condensation in the cooler parts of the casing. Standard lubricating oils which are presently on the market do not satisfactorily meet these requirements.

It is an object of this invention to provide a new and improved lubricating oil for hermetically sealed rotating equipment.

It is a further object of this invention to provide a new and improved arrangement for supplying lubricating and cooling media to a gyroscope or the like before it is hermetically sealed.

It is a still further object of this invention to provide a motor driven gyroscope or the like which operates at a satisfactory temperature and which is lubricated in a manner that greatly prolongs its useful life.

In carrying out my invention in one form, I distill crude petroleum oil in a novel manner to provide an improved lubricant having a wide range of distillation and condensation temperatures. Specifically, crude oil is first frozen and then distilled until the desired lubricant is collected. A rotating instrument is then charged with an inert gas and this new lubricant before being hermetically sealed, whereby an improved instrument is produced.

Further objects and advantages of this invention will become apparent and the invention will be more clearly understood from the following description referring to the accompanying drawing, and the features of novelty which characterize this invention will be pointed out with particularlity in the claim annexed to and forming a part of this specification.

In the drawing, Fig. 1 is a diagrammatic illustration of the apparatus used to distill this new and improved lubricant for a hermetically sealed gyroscope; Fig. 2 is a diagrammatic illustration of the apparatus used to supply lubricant and cooling gas to a gyroscope before it is hermetically sealed; and Fig. 3 is an elevational view, partly in section, of a sealed gyroscopic instrument.

Referring to the drawing, an inverted U-shaped tube 1 is provided with a quantity of crude oil 2 in the left-hand leg 3 of the tube.

The petroleum oil is frozen solidly by inserting leg 3 of the tube into a container of liquid oxygen or nitrogen (not shown).

After the liquid has been frozen, end 5 of leg 4 is connected to a vacuum pump (not shown) and tube 1 is exhausted down to a few millimeters pressure absolute, whereupon end 5 is sealed off.

Tube 1 is then held in a vertical position with leg 3 over a Bunsen burner 6, or other suitable heat source. As the heat is slowly applied, a clear distillate 2a vaporizes from the crude oil and condenses in leg 4 of tube 1. This distillate is a hydrocarbon fraction having a wide range of distillation and condensation temperatures. It is important that this distilling process not be hurried in any way. The distillation must be controlled to allow only a clear liquid to condense in leg 4. Any of the heavy particles and discoloration should be prevented from entering the distillate 2a in leg 4.

When approximately 50% of the crude oil has been distilled off, the oil at both ends of the tube is frozen solid by the liquid nitrogen or oxygen mentioned above and a seal (not shown) is formed at a point 7 in the upper portion of leg 4 of tube 1. The legs of the tube are separated and leg 3, containing the crude oil, may be discarded.

In Fig. 2, which diagrammatically represents the apparatus for transferring the lubricant to the instrument to be hermetically sealed, a vacuum pump 8 is shown connected to one end of an instrument 9 that is to be sealed. A gauge 10, a valve 11, a valve 12, and a supply 13 of an inert gas, such as helium, are connected to a tube 14 that joins instrument 9 with vacuum pump 8. Tube 15 connects instrument 9 to leg 4 of tube 1, which has been maintained in its frozen condition.

By way of example I have shown the instrument 9 at Fig. 3 as a conventional single-axis gyroscope comprising a gimbal ring 9a mounted upon bearings 9b in a sealed outer casing 9c and an electric motor 9d carried by the gimbal ring and constituting the gyroscope rotor.

After the system is pumped down by vacuum pump 8 and the instrument case 9 is warmed up, valve 11 is closed and the system is charged with an inert gas from the supply 13, and tube 14 is sealed off at a point 16 adjacent instrument 9. During the evacuation stage and the charging stage, it is important that the distillate in leg 4 be maintained in its frozen condition.

After the sealing at point 16, distillate 2a is warmed and a predetermined quantity of the pure distillate is boiled over into the instrument case, whereupon the distillate remaining in the tube 4 is again frozen and tube 15 is sealed off at a point 17 adjacent instrument 9.

It has been found from exhaustive tests that enough distillate should be boiled over to completely saturate the inert gas and then a few extra drops are transferred to make sure that enough lubricant is supplied to the instrument.

It is to be understood that by freezing the distillate after charging each instrument 9, a number of instruments can be lubricated with the one distillation of the crude oil.

With this new and improved lubricant, while the theory has not definitely been proven, it is believed that droplets of oil, beyond that quantity required to saturate the inert gas, collect in the bottom of the instrument case. Then, with the operation of the rotating elements within the instrument case, the inert gas circulates and carries unvaporized oil to the hot bearings which, in turn, vaporize the oil. As the cooling gas and oil vapor combination passes to the cool outside casing walls, the oil condenses and is ready again to lubricate hot bearings on the next cycle. As the oil condenses out, the cooling gas that contained the oil vapor becomes unsaturated and is ready to pick up some of the droplets of oil that are lying in the bottom of the casing; thus, a sufficiency of lubricant is carried to the hot bearings at all times.

Modifications of this invention will occur to those skilled in the art and it is desired to be understood, therefore, that this invention is not to be limited to the particular arrangement disclosed, but that the appended claim is meant to cover all modifications which are within the spirit and scope of this invention.

What I claim as new and desire to secure by Letters Patent of the United States is:

In a hermetically-sealed dynamoelectric machine including a rotatable member mounted upon bearings within a sealed outer casing, an inert gas filling said casing and surrounding said rotatable member and bearings, and a quantity of lubricating oil sealed in said casing and comprising the product of distillation of about 50% by volume of a crude petroleum oil, said quantity of lubricating oil being only slightly more than sufficient to saturate said inert gas at normal operating temperatures of said machine.

HOWARD I. BECKER.

REFERENCES CITED

The following references are of record in the file of this patent:

UNITED STATES PATENTS

| Number | Name | Date |
|---|---|---|
| 1,877,726 | Noble | Sept. 13, 1932 |
| 2,003,163 | Warren | May 28, 1935 |
| 2,301,595 | Washburn | Nov. 10, 1942 |
| 2,426,110 | McCorquodale et al. | Aug. 19, 1947 |
| 2,475,317 | Gess | July 5, 1949 |